May 27, 1969 M. M. HANSON ET AL 3,446,936
EVAPORANT SOURCE
Filed Jan. 3, 1966

INVENTORS
MARLIN M. HANSON
WILLIAM A. HARVEY
PAUL E. OBERG

BY Joseph A. Speldrich
AGENT

United States Patent Office 3,446,936

Patented May 27, 1969

3,446,936

EVAPORANT SOURCE

Marlin M. Hanson, Minneapolis, William A. Harvey, St. Paul, and Paul E. Oberg, Minneapolis, Minn., assignors to Sperry Rand Corporation, New York, N.Y., a corporation of Delaware Filed Jan. 3, 1966, Ser. No. 518,129

Int. Cl. F22b *1/28*

U.S. Cl. 219—271 1 Claim

ABSTRACT OF THE DISCLOSURE

An evaporant source causes materials to be completely vaporized eliminating any unvaporized particles which could otherwise be carried in the vapor stream.

The present invention relates generally to the evaporative fabrication of films in an evacuated chamber and more particularly to a method and apparatus for evaporating a uniform film of material on a substrate.

The evaporative fabrication of a film or films of material within an evacuated chamber is a technique that has recently been employed in the electronics industry for fabricating electrical apparatus, such as, integrated circuits. Conventional integrated circuits usually are composed of several layers of electrically conductive films which, in most instances are insulated from one another. Conventionally, the electrically conductive films and the electrically insulating films are formed within an evacuated chamber by vapor depositions techniques. Generally successful circuit design depends, in some degree, in each of the deposited layers having desirable uniform characteristics.

It has been found that when certain materials are employed to perform one or the other of the conductive or insulating functions of these layers, it becomes difficult to consistently attain films exhibiting the desired uniformity. A major difficulty results when the low thermal conductivity of certain non-conductive materials, such as silicon monoxide, which when heated develop unevenly hot areas which result in spattering. Spattering is characterized by the sudden ejection from the material being evaporated of solid or liquid particles. When such particles are deposited upon the substrate, they cause imperfections in the film such as pinholes which are detrimental to the desired operational characteristics of the fabricated film. Although metals do not generally exhibit the problem of spattering during the thermal evaporation, some difficulty has been experienced when working with certain types of metals, for example, cadmium, zinc, and magnesium.

In the past, in order to reduce spattering, evaporation sources have been adapted to provide a structural arrangment for causing an evaporant to ascend to a substrate member by following a diverse path from its source. For effecting such diverse paths, baffle plates have been interposed between the material in the evaporant container and the substrate upon which the evaporant is intended to be deposited. The baffles are effective to prevent the free flow of vapor between the baffles and the substrate by cutting off straight line paths between the materials and the substrate. Spattered particles are trapped on a baffle surface whereupon they may be retained or subsequently re-evaporated therefrom.

One of the major obstacles to the widespread use of thin-film micro-electronic circuitry has been the difficulty of depositing pinhole-free films of insulating materials.

The present invention in its various configurations describes novel evaporant sources which facilitate the deposition of homogeneous, pinhole-free films. To preclude the possibility of ejected large particles of evaporant from the melt material in the source from being deposited upon the substrate, techniques were developed to separate the large or macroscopic particles from the vapor prior to reaching the substrate. The pervading principle of operation of each of the described embodiments disclosed in the present invention is that of using a mass separation techniques wherein macroscopic particles are separated from the vapor or atomic and molecular dimensional particles. That is, the vapor particles are so directed to collide with each other in a short mean-free-path regions above the source whereby there is created something similar to a point source, free of undesirable heavy particles. The heavy particles, on the other hand, pass directly through the vapor and continue in a direction other than that in alignment with the substrate. Accordingly, only a uniform film is deposited.

It is therefore an object of the present invention to provide an improved method of evaporatively fabricating films of materials upon substrate members.

It is another object of the present invention to provide apparatus for reducing the effect of source spattering upon the deposited film layers on substrate members.

Yet another object of the present invention is to provide an improved apparatus for permitting the evaporative fabrication of both metallic and non-metallic films.

Still another object of the present invention is to provide a method and means for depositing films of materials without influencing their properties by thermal effects caused by direct heat radiation onto the substrate from the evaporant source.

Yet another object of the present invention is to provide a means of depositing homogeneous films of different composition without subjecting the substrate and/or any previously deposited films to possible undresirable treatment.

The novel features of the invention, as well as additional objects and advantages thereof, will be understood more fully, from the following description when read in connection with the accompanying drawings, in which.

Figure 1:
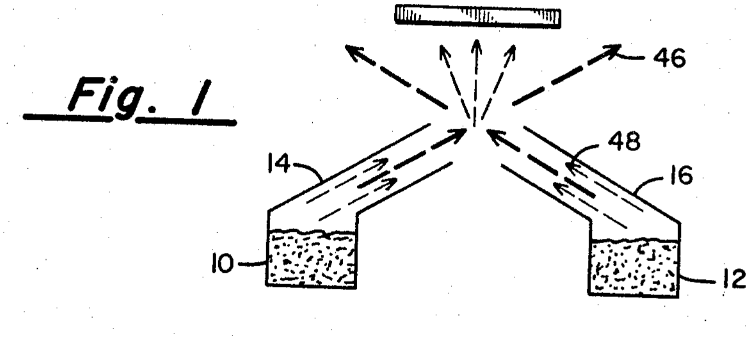
FIGURE 1 illustrates an embodiment in schematic utilizing two separate evaporation sources for directing evaporant streams towards each other in a collision path.

By way of reference to the embodiment illustrated in FIGURE 1, two evaporation sources 10 and 12 together with their angularly projecting shield members 14 and 16, contain the melt material to be evaporated. Suitable heater means provides thermal energy to the melt, which, when evaporated is channeled along the shielded opening whereby the heavy particles of the evaporant streams pass directly through the vapor and are not deflected towards the substrate above the sources. The vapor of atomic and molecular dimensionl particles, on the other hand, collide with each other in the short mean-free-path region above the sources, and act similar to a point source free of undesirable heavy particles. This momentum exchange between the vapor particles is such that the vapor is directed towards the substrate. The mean-free-path may be defined as the average value of the distances a molecule travels between successive collisions with other molecules.

Figure 2:
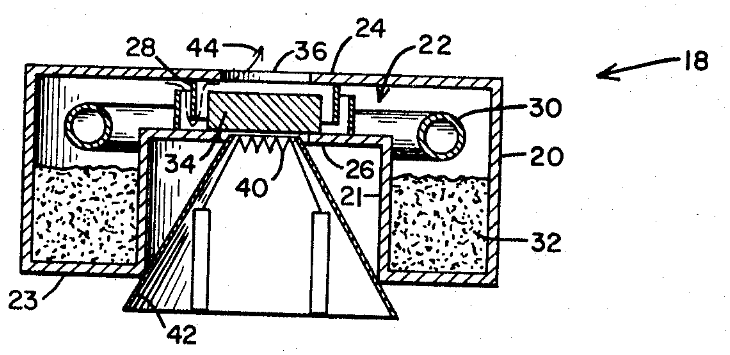
FIGURE 2 is another embodiment of the present invention in section utilizing a toroidally-shaped evaporation source incorporating baffle means and a heated bombardment member for receiving material to be evaporated having a composition different from that contained within the toroidally-shaped evaporant source.

By way of reference to FIGURE 2, there is illustrated an evaporant source of a second embodiment utilizing in part the principle of collision; however, incorporating an additional feature not found in FIGURE 1. As illustrated, the source comprises a pair of cylinders 20 and 21, the first being of a height $H_1$ and a radium $R_1$ and the second being of a height $H_2$ and a radium $R_2$, $H_2$ and $R_2$ being less than $H_1$ and $R_1$ respectively. The two cylinders are concentrically located one within the other to define a chamber 22. Fixedly secured to one end of the cylinders 20 and 21 is a first disc 23 having an outside radius of $R_1$ and an inside raidum of $R_2$. Another pair of disc members 24 and 26 are respectively secured to the other end of cylinder 20 and the other end of cylinder 21 and each has a centrally located aperture therein. Because of the difference in height of the two cylinders, there is defined a space between the disc members 24 and 26. Extending upwardly from the disc member 26 and downwardly from the disc member 24 are a pair of concentric rings of differing diameter. These rings serve as a baffle 28 as will be explained hereinafter. Also located concentrically with respect to cylinders 20 and 21 is a radiant heater element 30. Upon energization of the heater, radiant thermal energy is imparted to the melt 32 located in the space between cylindrical walls 20 and 21. A center post or electron bombardment block member 34 is disposed above the opening in the disc member 26. The post 34 is a heat conducting member which functions both as a point source and as a re-evaporating post member as will be further described below. Located within the second cylinder, i.e., cylinder 21 and operatively cooperating with the aperture in the disc member 26 is an electron filament element 40 for supplying a source of electrons directed toward the block member 34. An electron shield 42 directs the electron flow to the block, which, consequently becomes heated by the electron bombardment.

This particular embodiment has particular advantages in applications calling for multi-layered deposition processes. For example, a wire source material such as permalloy and copper may be fed onto the bombardment block 34. Dielectric material such as SiO, for example, is evaporated from the toroidal area 18 by energizing the radiant heater.

As the SiO evaporates, spattering effects may occur, which as explained above, are characterized by the sudden ejection of larger or macroscopic particles from the surface of the SiO melt caused by the low thermal conductivity of such materials. That portion of the evaporant consisting of the macroscopic particles is precluded from passing beyond the baffles 28 through the passage. That is, the large particles which travel in straight lines would find it practically impossible to find passage around the unsecured ends of the staggered array of baffles. For the most part then, the larger particles are either deflected out of the line of passage to the exist or are re-evaporated from the baffles when impinging thereon. Upon re-evaporation, the particles are reduced to vapor which then easily finds its way through the exist passage. However, for those large particles accidentally emanating from the baffled passage, they impinge upon the heated bombardment block member 34 and are re-evaporated into vapor. The evaporant stream flowing through the circular exist passage denoted by line 44, that is, around the circular cross-section, is caused to bombard itself somewhere in the space above member 34. The principle of operation at this point in the process is similar to that explained with respect to FIGURE 1. Even in the event that some large particles 46 do escape from the tortuous passage, they pass through the evaporant stream above the member 34 and continue in a direction other than toward the substrate as shown in FIGURE 1. The atomic and molecular dimensional particles 48, on the other hand, that is the vapor streams, collide in the mean-free-path region and act as a point source free of the larger particles, which otherwise if deposited cause the above-mentioned film imperfectations known as pinholes. Accordingly, the substrate utilizing the present evaporation source is free of the larger particles, hence resulting in a uniform film deposition.

Figure 3:
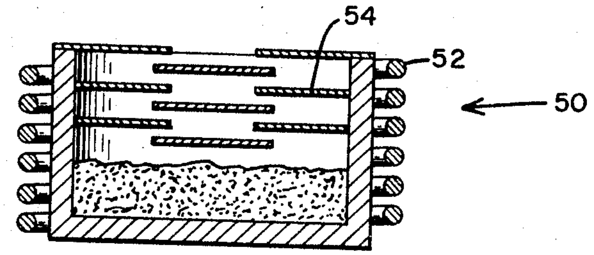
FIGURE 3 is another embodiment of the present invention in section utilizing an evaporation source incorporating therein a series of baffle means for impeding the flow of spattered particles and enhancing reevaporation of such particles impinging upon the baffles.

Referring to FIGURE 3, there is shown an evaporation source 50 having a circular cross-section although not necessarily to be limited thereto. The source is constructed of a suitable refractory material and is heated inductively by means of an RF coil 52 surrounding the outside of the container. A multi-tiered staggered series of baffles 54 secured to the walls of the source project physically into the path of the evaporant material. The staggered baffles may be washers, discs and the like suitably supported in the source such as by wire hanging and the like. Any suitable arrangement may be utilized as long as the baffles are staggered in tiers so as to provide a tortuous path for the evaporant. For purposes of clarity the baffles are shown as simply as possible to define the tortuous passage around the baffles. By reason of the multi-layered staggered configuration of the baffles, large particles are precluded from exiting and depositing upon the substrate. As the heavy particles are directed and impinge upon the baffles, they are caused to be re-evaporated and those, if any, which impinge upon the baffles and are deflected past one or more of the baffles are deflected back down into the melt material by succeeding baffle tiers. The tortuous path defined by the baffles is such that large particles ejected from the melt are deflected and re-evaporated by the baffles so as to preclude any significant possibility of escaping from the source. The baffles are so placed that impinging particles are re-evaporated with the result that only a fine vapor manages to find its way out of the source to the substrate strategically disposed above the source. In the event some large particles do escape, along with the vapor, they pass through the vapor as shown in FIGURE 1, directionally in non-alignment with the substrate, while the vapor or atomic and dimensional particles collide and are scattered to the substrate strategically disposed above the source. Consequently, film deposition consists of a uniform deposit with the freedom from pinhole formations in the film material itself.

Accordingly, the present invention provides in its various configurations a number of sources for vacuum deposition of pinhole-free films of insulators, semiconductors, and conductor. The sources make use of the collision principle whereby a point source is effectively created in the mean-free-path region. Homogeneous, pinhole-free films can be deposited with the sources at high evaporation rates at close source-to-substrate distances and the use of the described sources leads to reproducible films on a high yield basis.

Having now, therefore, fully illustrated and described our invention, what we claim to be new and desire to protect by Letters Patent is:

1. A container for holding a material to be evaporated during the vapor deposition of thin films, comprising:

a first cylinder having a height $H_1$ and a radius $R_1$;

a second cylinder having a height $H_2$ and a radius $R_2$ with $H_2$ and $R_2$ being smaller than $H_1$ and $R_1$ respectively;

a first disc member having a radius $R_1$ and a centrally located aperture of radius $R_2$ fixedly secured to said first and second cylinders at a first end to maintain said first and second cylinders in a concentric relationship;

a second disc member of radius $R_2$ fixedly secured to the other end of said second cylinder, said second disc member having an aperture centrally located therein;

a third disc member fixedly secured to the other end of said first cylinder and having a central aperture through which evaporant is adapted to pass;

first and second concentric rings of differing diameter secured to said second and third disc members to overlap in the space between said second and third discs;

a post mounted on said second disc over the aperture therein and within said concentric rings;

heating means disposed within said second cylinder for heating said post;

and a toroidal heating member having a radius $R_3$ in the range $_1>R_3>R_2$ concentrically mounted within the chamber defined by said first and second cylinders adapted to provide heat energy to the material to be evaporated, the arrangement being such that relatively large particles spattered during heating of the melt are prevented from passing through the evaporant outlet without being totally vaporized.

References Cited

UNITED STATES PATENTS

| | | | |
|---|---|---|---|
| 2,439,983 | 4/1948 | Morgan et al. | 118—49 |
| 2,793,609 | 5/1957 | Shen et al. | 117—107 X |
| 3,128,205 | 4/1964 | Illsley et al. | 117—106 X |
| 3,244,557 | 4/1966 | Chiou et al. | 117—107 X |
| 3,373,050 | 3/1968 | Paul et al. | 118—49.1 X |

OTHER REFERENCES

Weed: IBM Technical Disclosure Bulletin, vol. 2, no. 3, October 1959, pp. 27 and 28 relied upon.

Vergara et al.: The Review of Scientific Instruments, vol. 34, no. 5, May 1963, pp 520 to 522 relied upon.

ALFRED L. LEAVITT, *Primary Examiner.*

A. GOLIAN, *Assistant Examiner.*

U.S. Cl. X.R.

13—31; 118—491; 263—48